(12) United States Patent
Cousins et al.

(10) Patent No.: US 8,747,675 B2
(45) Date of Patent: Jun. 10, 2014

(54) ADSORBENTS

(75) Inventors: Matthew John Cousins, Darlington (GB); Kevin Young, Saltburn (GB)

(73) Assignee: Johnson Matthey PLC, London (GB)

( * ) Notice: Subject to any disclaimer, the term of this patent is extended or adjusted under 35 U.S.C. 154(b) by 712 days.

(21) Appl. No.: 13/062,854

(22) PCT Filed: Aug. 12, 2009

(86) PCT No.: PCT/GB2009/051003
§ 371 (c)(1),
(2), (4) Date: May 27, 2011

(87) PCT Pub. No.: WO2010/026402
PCT Pub. Date: Mar. 11, 2010

(65) Prior Publication Data
US 2011/0220576 A1 Sep. 15, 2011

(30) Foreign Application Priority Data
Sep. 8, 2008 (GB) .................................. 0816378.4

(51) Int. Cl.
*C02F 1/42* (2006.01)

(52) U.S. Cl.
USPC .......................................... 210/687; 210/688

(58) Field of Classification Search
USPC .................................. 210/687–688
See application file for complete search history.

(56) References Cited

U.S. PATENT DOCUMENTS

| 3,755,161 A | | 8/1973 | Yokota | |
|---|---|---|---|---|
| 4,508,838 A | | 4/1985 | Buckl | |
| 4,950,408 A | * | 8/1990 | Duisters et al. | 210/660 |
| 5,814,226 A | * | 9/1998 | Tavlarides et al. | 210/661 |
| 6,013,187 A | | 1/2000 | Burns | |

FOREIGN PATENT DOCUMENTS

GB 1336241 11/1973

OTHER PUBLICATIONS

Allenmark et al.: "Determination of Carboxylic Acids by Liquid Chromatography after Phase-Transfer-Catalysed Fluorogenic Labelling," Journal of Chromatography, vol. 456, 1988, pp. 410-416.
Kwan H. Nam: "Mercury (II) Adsorption from Wastewaters Using a Thiol Functional Adsorbent," Ind. Eng. Chem. Res., vol. 42, Mar. 28, 2003, pp. 1955-1964.
Arakaki et al.: "New Thiol Adsorbent Grafted on Silica Gel: Synthesis, Characterization and Employment for Heavy Metal Adsorptions," J. Environ. Monit., 2003, 5, pp. 366-370.
International Search Report from Application No. PCT/GB2009/051003, dated Dec. 2, 2009.

* cited by examiner

*Primary Examiner* — Chester Barry
(74) *Attorney, Agent, or Firm* — RatnerPrestia

(57) ABSTRACT

An adsorbent suitable for heavy metal absorption is described, comprising a thiol-functionalised support containing a stabilising amount of an alkaline metal reacted with said thiol functionality. The adsorbent may be used to remove heavy metals e.g. mercury and/or arsenic, from wastewater streams such as produced water or flue gas scrubber waters.

32 Claims, No Drawings

ADSORBENTS

CROSS-REFERENCE TO RELATED APPLICATIONS

This application is the U.S. National Phase application of PCT International Application No. PCT/GB2009/051003, filed Aug. 12, 2009, and claims priority of British Patent Application No. 0816378.4, filed Sep. 8, 2008, the disclosures of both of which are incorporated herein by reference in their entirety for all purposes.

FIELD OF THE INVENTION

This invention relates to adsorbents suitable for removing mercury and/or arsenic and other heavy metals from aqueous streams and their use.

BACKGROUND OF THE INVENTION

Mercury and arsenic and other heavy metals such as cadmium and lead are poisonous substances and are often present as soluble compounds in produced water from gas and oil recovery processes, and may be found in waste-water streams from refineries, flue gas washing and coal gasification. There is a need to find an environmentally sound and cost effective heavy metal removal technology.

U.S. Pat. No. 5,814,226 discloses a process for removing heavy metal ions from aqueous streams by contacting the streams with an inorganic ceramic support such as a silica gel on which has been supported a thiol or amine-functionality by means of a suitably functionalised organic silane or titanizing agent. No examples with mercury or arsenic are given.

Ind. Eng. Chem. Res. 2003, 42, 1955-1964 discloses mercury (II) ion adsorption from wastewaters using a thiol-functionalised adsorbent ("SOL-AD-IV"). The adsorbent is formed by co-hydrolysis of (3-mercaptopropyl) trimethoxy silane and tetraethoxysilane to form an adsorbent with specific physical characteristics.

J. Environ. Monit., 2003, 3, 366-370 discloses that mercury may also be absorbed from aqueous solutions using a thiol-functionalised silica material using a thiol-functionalised silane wherein the thiol-functionalised silane was formed on a silica gel surface by the reaction 3-mercaptopropyl silane and ethylene sulphide.

Thiol-functionalised adsorbents are however unstable, and the SOL-AD-IV adsorbent had to be stored under argon to prevent oxidation of the active thiols to inactive disulphides. Such storage would be prohibitively expensive and difficult on an industrial scale, even if an alternative inert gas was used. Furthermore the physical characteristics of the known products are not ideal for industrial scale use. We have further found that different physical characteristics in the supports can lead to adsorbents with improved heavy metal capture performance.

SUMMARY OF THE INVENTION

We have developed an adsorbent that overcomes the disadvantages of the known materials.

Accordingly the invention provides an adsorbent suitable for heavy metal adsorption absorption, comprising a thiol-functionalised support containing an alkaline metal.

The invention further provides a method for making an adsorbent comprising the steps of
(i) reacting a thiol-functionalised compound with a support to form a thiol-functionalised support, and
(ii) reacting the thiol-functionalised support with an alkaline metal compound to form the adsorbent.

The invention further provides a process, suitable for removing heavy metals comprising contacting the adsorbent with an aqueous stream containing one or more of these metals.

The term "heavy metals" includes mercury, arsenic, lead, cadmium, antimony, tin, copper, nickel, zinc, chromium, platinum, palladium and gold.

Whereas the thiol functionality may be provided by a variety of thiol (i.e. —SH group) containing compounds, preferably the thiol functionality is provided by a thiol-functionalised silane. This silane suitably has one or more reactive halide or alkoxy groups attached to the silicon atom that react with the support and one or more non-reactive thiol-containing groups. In a preferred embodiment the silane is of formula $(RO)_aSi((CH_2)_xSH)_b$ in which a is 2 or 3, b is 4-a, x is 1-6 and R is $CH_3$, $C_2H_5$ or $C_3H_7$. Especially the silane is (3-mercaptopropyl) trimethoxy silane or (3-mercaptopropyl) triethoxy silane.

The support may be supplied as a powder, which is processed into the final adsorbent material, or preferably, is supplied as a shaped unit, i.e. a particulate or monolithic material formed from such powders using techniques such as tabletting, extrusion and granulation. Starting with a shaped unit support is preferred because it lessens the risk of reducing the thiol functionality during subsequent processing. The support material preferably has hydroxyl functionality so that it may interact strongly with the thiol-containing compound, such as a silane. The support may be a silica, titania, alumina, zirconia, pillared clay, or zeolitic material, or a mixture thereof, which may further comprise a binder such as an aluminate cement. Hydrated oxides may also be used, for example alumina trihydrate or boehmite. The support is preferably a silica material, which may be natural or synthetic (precipitated silica) or a silica gel. We have found the properties of the support can influence the performance of the adsorbent.

The adsorbent desirably is in the form of a shaped unit with a minimum dimension in the range 1 to 15 mm and a maximum dimension in the range 1 to 25 mm, with an aspect ratio (longest dimension divided by shortest dimension)$\leq 4$. In one embodiment, the shaped units are spherical or roughly spherical with a diameter in the range 1-15 mm, preferably 1-10 mm, and more preferably 1-5 mm.

The physical properties of the adsorbent, such as the surface area, porosity and density of the particles can have a significant effect on the absorption profile. Thus beds of adsorbent of high bulk density and limited porosity, e.g. molded tablets, may exhibit a relatively broad absorption front, whereas bed of material with lower bulk density and higher porosity have been found to have much sharper absorption front. This enables a closer approach to be made to the theoretical absorption capacity.

The adsorbent preferably has a BET surface area in the range 200-500 $m^2/g$, more preferably 250-450 $m^2/g$. The adsorbent also preferably has a pore diameter in the range 70 to 150, more preferably 90-150 Angstroms, most preferably 100-150 Angstroms. The adsorbent also preferably has a pore volume$\geq 0.25$ $cm^3/g$, more preferably$\geq 0.50$ $cm^3/g$, most preferably$\geq 0.75$ $cm^3$. Adsorbents with these properties may be obtained by use of suitable support materials having physical properties that provide these characteristics in the final adsorbent. Such support materials may be made using known methods, but are also commercially available.

The adsorbent according to the present invention comprises a stabilizing amount of an alkaline metal, which we believe has reacted with the thiol functionality. Although the thiol-functional material is effective at trapping heavy metals such as mercury, it is susceptible to oxidation by air, which results in a reduced activity. Without wishing to be bound by theory, we believe the alkaline metal forms a metal sulphide compound that prohibits the oxidation of the thiol to form the less-active disulphide. The alkali metal is subsequently released upon exposure to heavy metal due to the favourable difference in reactivity with these metals and the stability of the resulting alkaline metal salt.

The alkaline metal may be one or more alkali metals or alkaline earth metals, or a mixture thereof. Preferably the alkaline metal is selected from one or more of Li, Na, K, CsMg, Ca or Ba, especially Na and/or Ca.

The level of thiol functionality is preferably in the range 0.1 to 10.0% wt (as S), more preferably 0.5 to 5.0% wt (as S), most preferably 0.5 to 3.0% wt (as S), which may be achieved, for example, by treating the supports with a suitable amount of (3-mercaptopropyl) trimethoxy silane. We have found surprisingly that highly effective adsorbents may be produced with relatively low thiol-levels compared to previous materials by selection of supports with different physical characteristics.

The alkaline metal content is preferably present in the adsorbent in an mount in the range 20-100% on a molar basis to the amount of thiol functionality (as S) present, depending upon the alkaline metal chosen. Desirably≥75%, more desirably≥90% of the thiol functionality is the adsorbent is reacted with an alkaline metal.

DETAILED DESCRIPTION OF THE INVENTION

The method of the present invention requires reacting a thiol-functionalised compound with a support to form a thiol-functionalised support. The reaction may be performed simply by combining the support and the thiol-functionalised compound in a suitable solvent under conditions where a reaction can take place and filtering or removing the solvent by evaporation. Temperatures <100° C. and reaction times <8 hrs have been shown to be effective. The thiol-functionalised compound is preferably a silane as described above. In this case the silane can reacts with the support, releasing halide or alkoxy groups to form a stable M-O—Si link (where M=Si. Al, Ti, Zr etc) that links the thiol functionality to the surface of the support. Silica supports are preferred as detailed above.

Suitable solvents for industrial scale use are alcohols such as industrial methylated spirit, denatured ethanol and the like. Water is not preferred when using silanes as can lead to competing side reactions that reduce the thiol-functionalisation of the support. Toluene may be used, but is less preferred because of handling difficulties.

If desired, the support may be treated with a modifying material prior to reaction with the thiol-functionalised compound to increase the reactivity of the support with the thiol-functionalised compound or modify the support physical properties. In particular where the support has a low reactivity with the thiol-functionalised compound, the modifying compound may increase the thiol functionality in the resulting adsorbent. For example we have found that alumina may be treated with an alkyl silicate, such as tetramethyl orthosilicate (TMOS), and dried to increase the support's reactivity with thiol-funtionalised silanes.

The thiol-functionalised support is treated with an alkaline metal compound to form an alkaline metal-modified thiol-functionalised support. Again this reaction may be performed by combining the thiol-functionalised support and alkaline metal compound in a suitable solvent and filtering or removing the solvent by evaporation to recover the product. The solvent in this case may be aqueous. Because of the high solubility of alkaline metal compounds in water and the ease of use, water is the preferred solvent.

The alkaline metal compound is preferably a soluble salt or other soluble compounds such as the hydroxide. The alkaline metal compound is preferably NaOH or $Ca(OH)_2$.

The adsorbent according to the present invention may be used widely to remove mercury, arsenic, lead, cadmium, antimony, tin, copper, nickel, zinc, chromium, platinum, palladium and gold. The invention is of particular utility for mercury and arsenic, especially mercury.

Herein by the term "adsorbent" we also include "absorbent".

The mercury and/or arsenic and/or other metals may be removed by contacting the aqueous stream containing mercury and/or arsenic and/or other metals with the shaped adsorbent either in batch mode, for example in a stirred tank, or preferably, in continuous mode. Batch mode generally requires filtration, which can be time consuming. In continuous mode the aqueous solution is passed through one or more fixed beds of the adsorbent in a suitable vessel such as an adsorbent column. Such practices are known and may be used effectively in the present invention.

The aqueous streams from which the heavy metals may be removed include produced water streams produced from natural gas or oil recovery processes, waste water streams from industrial processes such as refineries, power stations, coal gasifiers, or other contaminated aqueous streams. Thus the present invention may be applied to the removal of heavy metals from contaminated aqueous streams generated by the exploration and/or production of fossil fuels, such as natural gas, crude oil or coal. Alternatively the contaminated aqueous stream may be a by-product of the processing of fossil fuels used to generate chemical products and/or energy. Examples include aqueous streams from the co-production of reservoir water in oil and gas exploration and/or production, oil refining, gas transmission, Natural Gas Liquid (NGL) production, gasification, combustion processes such as Integrated Gasification Combined Cycle (IGCC) processes, or scrubber liquors, e.g. those obtained from flue-gas desulphurisation units. In an alternative embodiment, the adsorbent s may be used to remove heavy metals from water destined for use in industrial processes or for domestic/municipal use, e.g. as drinking water. In a further embodiment the adsorbent may be used to remove heavy metals from aqueous streams produced by the decontamination of industrial process equipment or transportation equipment, such as tankers, floating, production storage and off-loading (FPSO) facilities, static vessels or pipelines Typically the concentration of mercury in the contaminated feed stream is from 0.1 to 20 parts per million by weight (ppm wt).

Preferably the absorption of the heavy metals is conducted in the liquid phase at a temperature below 100° C., as at such temperatures the overall capacity for mercury absorption is increased. Temperatures as low as 4° C. may be used to good effect in the present invention. The pH of the aqueous stream is preferably in the range 2-10, more preferably 4-10, most preferably 5-9, especially 5-7. For pH's above 10 it maybe desirable to adjust the pH to 10 or below, e.g. by addition of a suitable acid, prior to treatment with the sorbent.

EXAMPLES

The invention is further described by reference to the following Examples.

Example 1

Preparation of Adsorbent

Step 1 (i). (3-Mercaptopropyl) trimethoxysilane (125.0 g, 1.65 mol) in ethanol (1L) was added to a silica material (500 g) in a round bottom flask and the contents stirred using an overhead mechanical stirrer. The reaction was carried out at reflux at a temperature between 70-80° C. for 1.5 hours. The beads were then filtered using Buchner filtration apparatus and washed thoroughly with acetone before being dried in an extracted oven at 40° C. overnight. Step (ii). The thiol-functionalised silica material was then transferred to a beaker containing a solution of NaOH (1L) and this then stirred at ambient temperature for 5 mins. The alkaline metal modified material was then filtered using Buchner filtration apparatus and washed thoroughly with water before being dried in an oven at 60° C. overnight. The resulting product was adsorbent A.

The experiment was repeated with two further different silica materials to generate adsorbents B and C.

Comparative materials D, E, F, G and H were prepared without alkaline-metal modification. Material D was made following the procedure in Step (i) only using the same silica support material. Materials E, G and H were made following the procedure in Step (i) only, but using different silica support materials, methanol instead of ethanol and refluxing at a temperature of between 55-65° C. Material F was made following the procedure of Example 1 in U.S. Pat. No. 5,814,226 on a silica gel.

The BET surface areas, average pore diameters and average pore volumes of the materials were determined. Measurements were made using Micromeritics Tristar 3000 and Micromeritics ASAP 2420 instruments. The BET surface areas were measured in accordance with ASTM D3663-03. The adsorption/desorption isotherms were measured in accordance with ASTM D4222-03. The adsorbate used was nitrogen at 77K. The linear portion of the BET plot was taken between relative pressures of 0.05 and 0.25. The pore volumes were determined from the adsorption branch of the isotherm at a relative pressure (P/Po) of 0.99. The average pore diameters were calculated from the pore volume at 0.99 P/Po and the BET surface area. The samples were outgased prior to measurements at 140° C. for a minimum of 1 hour with dry nitrogen purge. In addition, sulphur content of the material (wt % S) was determined by combustion of the sample at 1300° C. and subsequent IR analysis to quantify the amount of $SO_2$ evolved. Characterisation and post mortem analysis on the material after mercury removal testing was carried out by ICP-OES to determine the amount of mercury trapped on the material. The support characterisation data are given in Table 1.

TABLE 1

Support Properties

| Sample | Material description | $SiO_2$ Content (% wt) | Particle size range (sieved) (mm) | BET SA ($m^2$g) | Pore volume ($cm^3$/g) | Pore diameter (Angstroms) |
|---|---|---|---|---|---|---|
| A | silica titania | ≥98 | 1.7-4.0 | 307.00 | 0.94 | 122 |
| B | Amorphous, granular silica gel | ≥99 | 1.0-2.0 | 260.00 | 1.15 | 111 |
| C | Amorphous granular silica gel | ≥99 | 1.0-2.0 and 2.0-2.8 | 155.00 | 0.62 | 106 |
| D | silica titania | ≥98 | 1.7-4.0 | 307.00 | 0.94 | 122 |
| E | silica gel spheres | ≥99 | 3.0-6.0 | 331.10 | 1.06 | 128 |
| F | Silica, amorphous pptd and gel | ≥99 | 0.063-0.210 | 474.40 | 0.77 | 65 |
| G | Silica, amorphous pptd and gel | 97 | 1.19-3.36 | 609.70 | 0.38 | 25 |
| H | Amorphous, granular silica gel | ≥99 | 1.4-6.75 | 692.90 | 0.37 | 21 |

The adsorbent characterisation data are given in Table 2.

TABLE 2

Adsorbent properties

| Sample | Particle size (mm) | BET SA ($m^2$g) | Pore volume ($cm^3$/g) | Pore diameter (Angstroms) | S loading (wt %) |
|---|---|---|---|---|---|
| A | 1.7-4.0 | 279.5 | 0.78 | 112 | 1.36 |
| B | 1.0-2.0 | Not analysed | Not analysed | Not analysed | 2.10 |
| C | 1.0-2.0 and 2.0-2.8 | 116.0 | 0.38 | 131 | 2.12 |
| D | 1.7-4.0 | 277.2 | 0.76 | 110 | 1.60 |
| E | 3.0-6.0 | 282.70 | 0.82 | 115 | 1.50 |
| F | 0.063-0.210 | 327.00 | 0.44 | 53 | 4.37 |
| G | 1.19-3.36 | 609.70 | 0.34 | 25 | 1.30 |
| H | 1.4-6.75 | 656.3 | 0.34 | 21 | 0.71 |

Example 2

Testing

These tests were performed to closely replicate the fixed bed process condition. This is a continuous process and exit samples from the reactor indicate the efficiency of the material in removing mercury. In the test, an absorption vessel was charged with functionalised adsorbent material (25 ml). An aqueous solution of mercuric chloride from a feed vessel (4L capacity) was then pumped through the reactor containing the adsorbent material by a circulation pump at a flow rate of 1 ml/min. The solution from the feed vessel was analysed by an atomic fluorescence analysis system to measure the concentration of $Hg^{2+}$. This provided the mercury concentration at the inlet of the absorption vessel. This was maintained as closely as possible to 10 ppm by a concentrated mercuric chloride solution from a separate vessel via a dosing pump. The solution exiting the adsorbent vessel was collected in a collection vessel with an overflow line that returned the overflow to the feed line of the adsorption vessel. In this way the process was run continuously The solution in the collection vessel was sampled to measure the concentration of mercury exit the reactor. The concentration of mercury detected in the exit solution that was required to stop the test, also known as the breakthrough level, was set arbitrarily at 20% of the inlet concentration, so in this case when the exit concentration is greater that 2 ppm the test was stopped. The breakthrough times for the materials are given in Table 3.

TABLE 3

| Adsorbent | Flowing test length (hrs) |
| --- | --- |
| A | 600 |
| B | 809 |
| C | 787 |
| D | 414 |
| E | 188 |
| F | 194 |
| G | 268 |
| H | 125 |

Adsorbents A, B & C according to the invention are superior to the others tested. Post-test analyses on the spent adsorbents from flowing tests are shown in Table 4.

TABLE 4

| Adsorbent. | Mass (g) | Volume (ml) | [Hg] (ppm) | Mass Hg (g) |
| --- | --- | --- | --- | --- |
| A | 12.127 | 25 | 119000 | 0.183 |
| B | 10.692 | 25 | 298510 | 0.388 |
| C | 15.461 | 25 | 189400 | 0.372 |
| D | 11.963 | 25 | 82600 | 0.117 |
| E | 10.532 | 25 | 119762 | 0.144 |
| F | 18.855 | 25 | 26465 | 0.054 |
| G | 17.615 | 25 | 22910 | 0.052 |
| H | 19.501 | 25 | 8635 | 0.020 |

The results demonstrate the effectiveness of adsorbents A, B and C as compared to the comparative materials. The presence of alkaline metal therefore appears to have enhanced the performance of the material D. Adsorbent E is equally effective as adsorbent A initially but suffers from the ageing problem described above. For Example, for adsorbent E, flowing tests were carried out as described above over a 145-day period, again stopping the test at 2 ppm Hg breakthrough. The results are given in table 5.

TABLE 5

Ageing of Adsorbent E

| Age of material (days) from first test | Hg content of bed (ppm) | Mass of Hg captured (g) |
| --- | --- | --- |
| 0 | 119762 | 0.144 |
| 7 | 118765 | 0.137 |
| 49 | 67980 | 0.0847 |
| 145 | 12430 | 0.0176 |

The results in table 5 show a marked reduction in the Hg capacity of the material when stored under ambient conditions under air over this period. In contrast, Absorbent A maintains its performance. Testing after a further 35 weeks from the initial test gave a breakthrough time of 636 hrs (an increase of about 6%) and mercury recovery as set out in table 6.

TABLE 6

Comparison Adsorbent A ageing

| Age of material (days) from first test | Hg content of bed (ppm) | Mass of Hg captured (g) |
| --- | --- | --- |
| 0 | 119000 | 0.183 |
| 119 | 107000 | 0.187 |
| 245 | 158100 | 0.235 |

The Absorbent A has retained its activity indicating the effectiveness of the sodium-modification with regards to ageing.

Example 3

Mercury and Arsenic Removal

A static test was performed on a solution containing arsenic and mercury using Adsorbent A.

0.5 g of sorbent A was added to 100 ml demineralised water containing a known concentration of mercuric chloride and arsenic trioxide. This mixture was stirred at ambient temperature. Samples were taken at specific time intervals, i.e. 1, 2, 5, 10, 20, 40, 60, 120, 240, and 360 mins. These samples were then analysed for their mercury and arsenic content using atomic fluorescence analysis. The results are given in table 7.

TABLE 7

Static test on Adsorbent A for As and Hg

| | Concentration of contacting solution (ppb) | |
| --- | --- | --- |
| Time (mins) | Hg | As |
| 0 | 850 | 750 |
| 5 | 900 | 650 |
| 10 | 550 | 550 |
| 20 | 450 | 500 |
| 40 | 350 | 550 |
| 60 | 350 | 450 |
| 120 | 300 | 250 |

The results show that both Hg and As are adsorbed from the solution in this test.

A static test was performed on a solution containing arsenic and mercury using Adsorbent C. In this test, a measured amount of adsorbent material (1.1 g) was added to 100 ml demineralised water containing a known concentration of mercuric chloride and arsenic trioxide. This mixture was stirred at ambient temperature for 2 weeks. The solution was then analysed by ICPOES at the start and the end of the test for mercury and arsenic content. The results are given in table 8.

TABLE 8

Static test on Adsorbent C for As and Hg

| | Concentration of contacting solution (ppm) | |
| --- | --- | --- |
| | Hg | As |
| Start of test | 158 | 175 |
| After 2 weeks | 0 | 62 |
| % Removal | 100 | 65 |

The results show that Adsorbent C removed both mercury and arsenic from the mixed solution, but that is shows an increased selectivity for mercury over arsenic.

Example 4

Mercury Removal

A static test was performed according to the method of Example 3 on a sample of produced water containing mercury, using Adsorbent A. The analysis of the produced water before testing was as follows;

TABLE 8

Table showing ICP-MS/ICP-OES compositional analysis of produced water

| Analyte | Concentration (ppm) |
|---|---|
| As | 0.120 |
| Ca | 0.222 |
| K | <0.050 |
| Mg | 0.036 |
| Na | 0.244 |
| S | 10.8 |
| Zn | 0.001 |
| Fluoride | <0.1 |
| Chloride | 1.65 |
| Nitrate | <0.1 |
| Sulphate | 0.18 |

The mercury content was adjusted upwards to about 11 ppm and the static test performed using Absorbent A. The results are given in table 9.

TABLE 9 static test on produced water using absorbent A.

| Time (mins) | Hg concentration of the contacting solution (ppm) |
|---|---|
| 0 | 10.936 |
| 10 | 8.486 |
| 20 | 6.188 |
| 40 | 4.928 |
| 60 | 3.070 |
| 120 | 1.874 |
| 160 | 1.158 |

The results demonstrate the effectiveness of the absorbent in removing mercury despite the presence of other metal compounds.

Example 5

Ca-modified Adsorbent

Using the preparation method detailed in Example 1, a Ca-modified adsorbent (Adsorbent I) was prepared on the same silica-titania support using (3-mercaptopropyl) trimethoxy silane but with $Ca(OH)_2$ in place of NaOH. The support and adsorbent properties are given in Table 10.

TABLE 10

| | Particle size range (sieved)(mm) | BET SA ($m^2g$) | Pore volume ($cm^3/g$) | Pore diameter (Angstroms) | S loading (wt %) |
|---|---|---|---|---|---|
| Support material | 1.7-4.0 | 307.0 | 0.94 | 122 | n/a |
| Adsorbent I | 1.7-4.0 | 283.3 | 0.76 | 108 | 1.45 |

This adsorbent was tested in a flowing test at 1-week, 18 weeks (126 days) and 36 weeks (252 days), with storage in between at ambient temperature under air. The results are detailed in Table 11.

TABLE 11

| | Adsorbent I | | | |
|---|---|---|---|---|
| Sample | Mass (g) | Volume (ml) | [Hg] (ppm) | Mass Hg (g) |
| 1 week | 11.951 | 25 | 109000 | 0.156 |
| 18 weeks | 12.061 | 25 | 103400 | 0.162 |
| 36 weeks | 11.678 | 25 | 128700 | 0.200 |

Despite a difference of 35 weeks between tests, the Ca-stabilised adsorbent has retained its capacity for Hg under these conditions.

Example 6

Mercury Removal

A static test was performed according to the method of Example 3 on a solution containing mercury nitrate [$Hg(NO_3)_2$], using Adsorbent B. The results are given in Table 12.

TABLE 12

Testing of Adsorbent B with Mercury Nitrate

| Time (mins) | Hg concentration of the contacting solution (ppm) |
|---|---|
| 0 | 11.4 |
| 10 | 4.6 |
| 20 | 3.7 |
| 40 | 2.5 |
| 280 | 0.9 |
| 360 | 0.6 |

The sodium-stabilised adsorbent (material B) has shown 95% mercury removal from a solution of mercury nitrate over 6 hours.

Example 7

Testing for Mercury Removal at Differing pH

A static test was performed according to the method of Example 3 using Adsorbent B, on a solution containing mercury chloride to which sodium hydroxide had been added until the pH of the mercury chloride solution was 13. The test was also performed on a mercury chloride solution to which hydrochloric acid had been added until the pH of the mercury chloride solution was 2. The results are given in Table 13.

TABLE 13

Testing of Adsorbent B with pH

| Time (mins) | Hg concentration of the contacting solution (ppm) | |
|---|---|---|
| | pH 2 | pH 13 |
| 0 | 14.1 | 14.1 |
| 10 | 8.6 | not analysed |
| 20 | 2.8 | 10.1 |
| 40 | 2.3 | 7.1 |
| 60 | 1.3 | 5.2 |
| 120 | 0.3 | 4.2 |
| 280 | 0.0 | 3.8 |

Adsorbent B showed good mercury removal at pH 2, but when the pH was increased to 13, the material started to break up thus reducing the mercury removal performance. Further tests indicated good stability up to pH 10.

Example 8

Preparation and Testing of Adsorbents with Differing Sulphur Loadings

Materials J, K, L and M were prepared with alkaline-metal modification using the procedures 1(i) and 1(ii) of Example 1 but varying amounts of thiol in the reaction to give materials of varying sulphur content. The sulphur loadings are given in Table 14.

TABLE 14

Adsorbent properties

| Material | Particle size (mm) | S loading (wt %) |
|---|---|---|
| J | 1-2 | 0.75 |
| K | 1-2 | 1.40 |
| L | 1-2 | 3.27 |
| M | 1-2 | 6.80 |

The adsorbents J-L were tested in a flowing test as described in Example 2. The results are detailed in Table 15.

TABLE 15

Mercury removal with Adsorbents J-L

| Adsorbent. | Flowing test length (hrs) | Mass (g) | Volume (ml) | [Hg] (ppm) | Mass Hg (g) |
|---|---|---|---|---|---|
| J | 592 | 9.831 | 25 | 110600 | 0.138 |
| K | 456 | 10.242 | 25 | 153600 | 0.195 |
| L | 1377 | 11.369 | 25 | 368400 | 0.570 |

The results show that with increasing sulphur loadings on the adsorbent material, increased levels of mercury are removed from the water feed before the test reaches breakthrough.

The invention claimed is:

1. An adsorbent suitable for heavy metal adsorption, comprising a thiol-functionalised support, wherein a thiol functionality is provided with a thiol-functionalised silane, containing an alkaline metal reacted with said thiol functionality, wherein the alkaline metal is present in the adsorbent in an amount in the range 20-100% on a molar basis to the amount of thiol functionality (as S) present.

2. An adsorbent according to claim 1 wherein the silane is of formula $(RO)_aSi((CH_2)_xSH)_b$ in which a is 2 or 3, b is 4-a, x is 1-6 and R is $CH_3$, $C_2H_5$ or $C_3H_7$.

3. An adsorbent according to claim 1 wherein the silane is (3-mercaptopropyl) trimethoxy silane or (3-mercaptopropyl) triethoxy silane.

4. An adsorbent according to claim 1 wherein the support is selected from the group consisting of a silica, titania, alumina, zirconia, clay, and zeolitic material, and mixtures thereof, which may further comprise a binder such as an aluminate cement.

5. An adsorbent according to claim 1 wherein the support is a silica material.

6. An adsorbent according to claim 1 wherein the adsorbent has a BET surface area in the range 200-500 $m^2/g$.

7. An adsorbent according to claim 1 wherein the adsorbent is porous with a pore diameter in the range 70-150 Angstroms.

8. An adsorbent according to claim 1 wherein the adsorbent is porous with a pore volume ≥0.25 $cm^3/g$.

9. An adsorbent according to claim 1 wherein the adsorbent is in the form of a shaped unit with a minimum dimension in the range 1 to 15 mm and a maximum dimension in the range 1 to 25 mm, with an aspect ratio (longest dimension divided by shortest dimension) ≤4.

10. An adsorbent according to claim 9 wherein the shaped units are spherical or roughly spherical with a diameter in the range 1-15 mm.

11. An adsorbent according to claim 1 wherein the alkaline metal is selected from the group consisting of one or more alkali metals, alkaline earth metals, and mixtures thereof.

12. An adsorbent according to claim 11 wherein the alkaline metal is selected from the group consisting of Li, Na, K, Cs Mg, Ca, and Ba, and mixtures thereof.

13. An adsorbent according to claim 12 wherein the alkaline metal is selected from the group consisting of Na and Ca.

14. An adsorbent according to claim 1 wherein the level of thiol functionality is in the range 0.1-10.0% wt (as S).

15. A method for making an adsorbent comprising a thiol-functionalised support, which method comprises the steps of:
(i) reacting a thiol-functionalised silane with a support to form a thiol-functionalised support, and
(ii) reacting the thiol-functionalised support with an alkaline metal compound, wherein the alkaline metal compound is provided in an amount sufficient to provide alkaline metal in an amount in the range 20-100% on a molar basis to an amount of thiol functionality (as S) present.

16. A method according to claim 15 wherein the silane is of formula $(RO)_aSi((CH_2)_xSH)_b$ in which a is 2 or 3, b is 4-a, x is 1-6 and R is $CH_3$, $C_2H_5$ or $C_3H_7$.

17. A method according to claim 15 wherein the silane is (3-mercaptopropyl) triethoxy silane.

18. A method according to claim 15 wherein the support is selected from the group consisting of a silica, titania, alumina, zirconia, clay, and zeolitic material, and mixtures thereof, which may further comprise a binder such as an aluminate cement.

19. A method according to claim 15 wherein the support is a silica material.

20. A method according to claim 15 wherein the alkaline metal compound is selected from the group consisting of alkali metal compounds, and alkaline earth metal compounds, and mixtures thereof.

21. A method according to claim 20 wherein the alkaline metal compound is selected from the group consisting of compounds of Li, Na, K, Cs Mg, Ca, and Ba, and mixtures thereof.

22. A method according to claim 21 wherein the alkaline metal compound is selected from the group consisting of NaOH and $Ca(OH)_2$.

23. A method according to claim 15 wherein the thiol-functionalised compound is provided in an amount sufficient to provide a level of thiol functionality in the adsorbent in the range 0.1-10.0% wt (as S).

24. A process for the removal of heavy metals from an aqueous stream, comprising contacting an adsorbent comprising a thiol-functionalised support, wherein a thiol functionality is provided with a thiol-functionalised silane, containing an alkaline metal reacted with said thiol functionality, wherein the alkaline metal is present in the adsorbent in an amount in the range 20-100% on a molar basis to the amount of thiol functionality (as S) present, with the contaminated aqueous stream.

25. A process according to claim 24 wherein the heavy metal is selected from the group consisting of mercury, arsenic, lead, cadmium, antimony, tin, copper, nickel, cobalt, zinc, chromium, platinum, palladium, and gold, and mixtures thereof.

26. A process according to claim 24 wherein the stream is a contaminated aqueous stream generated by the exploration and/or production of fossil fuels.

27. A process according to claim 24 wherein the stream is a by-product of the processing of fossil fuels used to generate chemical products and/or energy.

28. A process according to claim 24 wherein the stream is water for use in industrial processes.

29. A process according to claim 24 wherein the stream is water for domestic and/or municipal use.

30. A process according to claim 24 wherein the stream is produced by the decontamination of industrial process equipment or transportation equipment.

31. A process according to claim 24 wherein the pH of the aqueous stream is in the range 2-10.

32. A process according to claim 31 wherein the pH range is obtained by a step of adjusting the pH to 10 or below prior to treatment with the sorbent.

\* \* \* \* \*